(12) United States Patent
Hidaka

(10) Patent No.: US 11,001,150 B2
(45) Date of Patent: May 11, 2021

(54) BATTERY PACK

(71) Applicant: Samsung SDI Co., Ltd., Yongin-si (KR)

(72) Inventor: Takao Hidaka, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 122 days.

(21) Appl. No.: 16/349,944

(22) PCT Filed: Oct. 19, 2017

(86) PCT No.: PCT/KR2017/011603
§ 371 (c)(1),
(2) Date: May 14, 2019

(87) PCT Pub. No.: WO2018/117386
PCT Pub. Date: Jun. 28, 2018

(65) Prior Publication Data
US 2019/0334356 A1 Oct. 31, 2019

(30) Foreign Application Priority Data
Dec. 21, 2016 (KR) .......................... 10-2016-0175833

(51) Int. Cl.
*H02J 7/00* (2006.01)
*B60L 3/12* (2006.01)
(Continued)

(52) U.S. Cl.
CPC .................... *B60L 3/12* (2013.01); *B60L 3/04* (2013.01); *B60L 50/60* (2019.02); *B60L 50/64* (2019.02);
(Continued)

(58) Field of Classification Search
USPC .................................................. 320/116, 134
See application file for complete search history.

(56) References Cited

U.S. PATENT DOCUMENTS 8,212,523 B2 * 7/2012 Tatebayashi .......... H02J 7/0016
320/118
2010/0253284 A1 * 10/2010 Aoki ..................... H02J 7/0016
320/118

(Continued)

FOREIGN PATENT DOCUMENTS

JP  10-290536 A  10/1998
JP  2011-19329 A  1/2011
(Continued)

*Primary Examiner* — Samuel Berhanu
(74) *Attorney, Agent, or Firm* — Lewis Roca Rothgerber Christie LLP

(57) ABSTRACT

A battery pack may include: a plurality of cell stacks; a plurality of monitoring circuits configured to detect voltages of a plurality of cells included in a corresponding cell stack among the cell stacks; a plurality of current measurement circuits configured to measure current consumption of a corresponding monitoring circuit among the monitoring circuits; a plurality of current adjustment circuits configured to adjust a discharge current of a corresponding cell stack among the cell stacks; and a battery controller configured to receive a current consumption measurement result of the monitoring circuits from the current measurement circuits, to calculate current consumption deviation between the monitoring circuits based on the current consumption measurement result of the monitoring circuits, and to control the current adjustment circuits based on the current consumption deviation.

16 Claims, 9 Drawing Sheets

(51) Int. Cl.
*B60L 50/60* (2019.01)
*B60L 58/22* (2019.01)
*B60L 3/04* (2006.01)
*B60L 50/64* (2019.01)

(52) U.S. Cl.
CPC ............ *B60L 58/22* (2019.02); *H02J 7/0019* (2013.01); *H02J 7/0026* (2013.01); *B60L 2240/549* (2013.01)

(56) References Cited

U.S. PATENT DOCUMENTS

| | | |
|---|---|---|
| 2011/0080140 A1 | 4/2011 | Hogari et al. |
| 2011/0210700 A1* | 9/2011 | Shimizu ............... H02J 7/0016 320/116 |
| 2013/0119934 A1* | 5/2013 | Suzuki ................ H02J 7/0016 320/112 |
| 2013/0147433 A1 | 6/2013 | Chen et al. |
| 2013/0187610 A1* | 7/2013 | Hayashi .................. H02J 7/00 320/118 |

FOREIGN PATENT DOCUMENTS

| | | |
|---|---|---|
| JP | 4770522 B2 | 9/2011 |
| JP | 5126251 B2 | 1/2013 |
| JP | 2015-202046 A | 11/2015 |
| JP | 2016-15839 A | 1/2016 |
| KR | 10-1494081 B1 | 2/2015 |
| KR | 10-1537093 B1 | 7/2015 |

\* cited by examiner

BATTERY PACK

CROSS-REFERENCE TO RELATED APPLICATION(S)

This application is a National Phase Patent Application of International Patent Application Number PCT/KR2017/011603, filed on Oct. 19, 2017, which claims priority of Korean Patent Application No. 10-2016-0175833, filed Dec. 21, 2016. The entire contents of both of which are incorporated herein by reference.

TECHNICAL FIELD

An exemplary embodiment relates to a battery pack.

BACKGROUND ART

Recently, according to strengthening of environmental regulations including $CO_2$ regulations, interest in environmentally-friendly vehicles has been increasing. Accordingly, vehicle companies have been actively researching and developing pure electrical vehicles and hydrogen vehicles as well as hybrid and plug-in hybrid vehicles.

A high-voltage battery for storing electrical energy obtained from various energy sources is applied to the environmentally-friendly vehicles. The high-voltage battery needs to supply high-voltage electrical energy of 200 V to 800 V to an inverter to drive a driving motor of the vehicle. To this end, the high-voltage battery is configured to include a plurality of battery modules connected in series with each other.

A battery management system (BMS) for managing a high-voltage battery is mounted in a vehicle to which the high-voltage battery is applied. A cell balancing function which compensates a voltage deviation between cells constituting a battery module by monitoring the voltage of each of the cells is one of the main functions of the battery management system. The battery management system includes a monitoring circuit for monitoring a cell voltage for each battery module for cell balancing.

For efficient use of high-voltage batteries, it is also important to maintain battery balancing as well as cell balancing. A deviation of current consumption of a monitoring circuit for monitoring the cell voltage may cause a voltage imbalance between the battery modules. That is, since the monitoring circuit uses the entire voltage of the corresponding battery module for power, a deviation of current consumption between monitoring circuits may cause a voltage imbalance between the corresponding battery modules.

DISCLOSURE

Technical Problem

Exemplary embodiments have been made in an effort to provide a battery pack that minimizes a deviation of current consumption between monitoring circuits to minimize an imbalance between battery modules.

Technical Solution

An exemplary embodiment of the present invention provides a battery pack including: a plurality of cell stacks; a plurality of monitoring circuits configured to detect voltages of a plurality of cells included in a corresponding cell stack among the cell stacks; a plurality of current measurement circuits configured to measure current consumption of a corresponding monitoring circuit among the monitoring circuits; a plurality of current adjustment circuits configured to adjust a discharge current of a corresponding cell stack among the cell stacks; and a battery controller configured to receive a current consumption measurement result of the monitoring circuits from the current measurement circuits, to calculate current consumption deviation between the monitoring circuits based on the current consumption measurement result of the monitoring circuits, and to control the current adjustment circuits based on the current consumption deviation.

The battery pack may further include a plurality of current detection resistors respectively connected between the cell stacks and the monitoring circuits, and each of the measurement circuits may measure a current flowing through a corresponding current detection resistor among the current detection resistors and may output the measured current as a measured value of the current consumption.

Each of the monitoring circuits may include a voltage detection integrated circuit, and each of the current detection resistors may be connected between a corresponding one of the cell stacks and a power terminal of the voltage detection integrated circuit.

The current measurement circuits may be disposed within the voltage detection integrated circuit of a corresponding monitoring circuit among the monitoring circuits.

The current adjustment circuits may be disposed within the voltage detection integrated circuit of a corresponding monitoring circuit among the monitoring circuits.

The battery pack may further include a plurality of short-circuit switches respectively connected between the cell stacks and the monitoring circuits, and each of the short-circuit switches may be connected in parallel with a corresponding one of the current detection resistors.

The battery controller may control the short-circuit switches to be turned off during a period for measuring current consumption by using the current measurement circuits.

The battery controller may control the short-circuit switches to be turned on during a period for detecting cell voltages by using the monitoring circuits.

Each of current detection resistors may be connected between a negative terminal of a lowest potential cell among a plurality of cells included in a corresponding cell stack of the cell stacks and a ground terminal of a corresponding monitoring circuit of the monitoring circuits.

Each of the current adjustment circuits may include a plurality of resistors connected between opposite ends of a corresponding cell stack of the cell stacks, and a plurality of switches connected to corresponding resistors of the resistors to block or conduct current flows of the corresponding resistors.

The battery controller may adjust a discharge current of a corresponding cell stack of the cell stacks by adjusting a number of switches that are turned on among the switches.

Each of the current adjustment circuits may include a plurality of balancing resistors connected between a corresponding cell stack of the cell stacks and a corresponding monitoring circuit of the monitoring circuits, and a plurality of switches connected to corresponding balancing resistors of the balancing resistors to block or conduct current flows of the corresponding balancing resistors.

The battery controller may receive a cell voltage detection result for each of the cell stacks through the monitoring circuits, and may control cell balancing of each of the cell stacks by controlling the switches based on the cell voltage detection results.

The battery controller may turn on the switches included in a corresponding current adjustment circuit among the current adjustment circuits for a monitoring circuit having relatively small current consumption among the monitoring circuits.

The battery controller may control a turn-on duty of the switches included in each of the current adjustment circuits to adjust a current consumption amount of the current adjustment circuits.

An exemplary embodiment of the present invention provides a battery pack including: a cell stack configured to include a plurality of cells; a voltage detection integrated circuit electrically connected to the cells to detect cell voltages of the cells; a current measurement resistor connected between one of opposite ends of the cell stack and a power terminal of the voltage detection integrated circuit; a short-circuit switch connected in parallel with the current measuring resistor; a current measurement circuit configured to measure a current flowing in the current measurement resistor; a current adjustment circuit connected between opposite ends of the cell stack to adjust a discharge current of the cell stack; and a battery controller configured to control turn-on of the short-circuit switch, to receive a current measurement result from the current measurement circuit in a state where the short-circuit switch is turned off, and to control the current adjustment circuit based on the current measurement result.

Advantageous Effects

According to the exemplary embodiments, it is possible to minimize a deviation of current consumption between monitoring circuits to minimize imbalance between battery modules.

MODE FOR INVENTION

Figure 1:
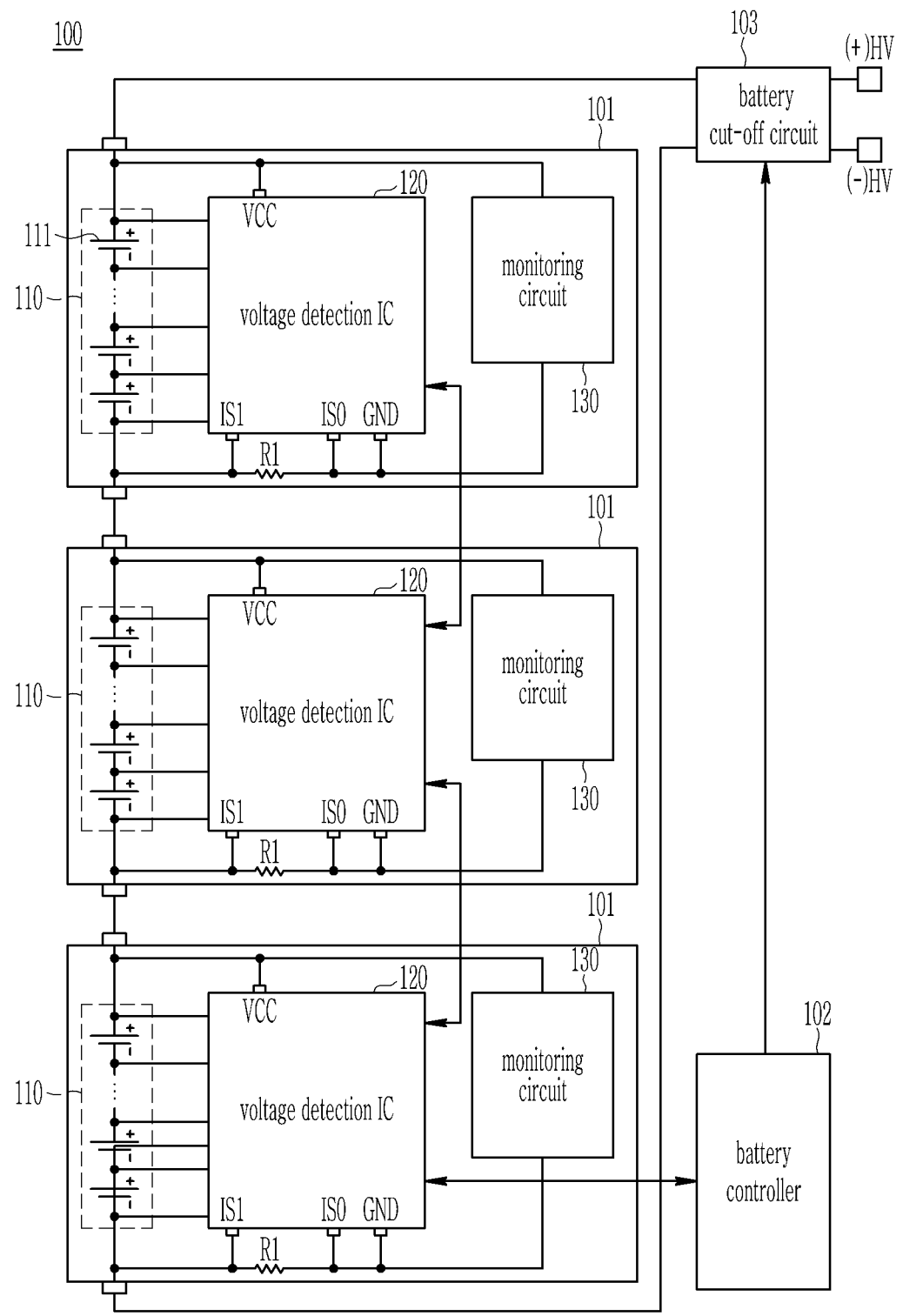
FIG. 1 schematically illustrates a battery pack according to a first exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clearly describe the exemplary embodiments, parts that are irrelevant to the description are omitted, and like numerals refer to like or similar constituent elements throughout the specification. Therefore, the reference numbers of the constituent elements used in a previous drawing may be used in a subsequent drawing.

Further, since sizes and thicknesses of constituent members shown in the accompanying drawings are arbitrarily given for better understanding and ease of description, the exemplary embodiments are not limited to the illustrated sizes and thicknesses. In the drawings, the thickness of layers, films, panels, regions, etc., are exaggerated for clarity.

A case of electrically connecting two constituent elements includes not only a case of directly connecting the constituent elements but also a case of connecting the constituent elements via another constituent element therebetween. The constituent element therebetween may include a switch, a resistor, a capacitor, and the like. In describing exemplary embodiments, an expression of connection indicates electrical connection unless explicitly described to be direct connection.

Hereinafter, a battery management system (BMS) according to exemplary embodiments and a battery pack including the same will be described in detail with reference to the drawings.

Figure 2:
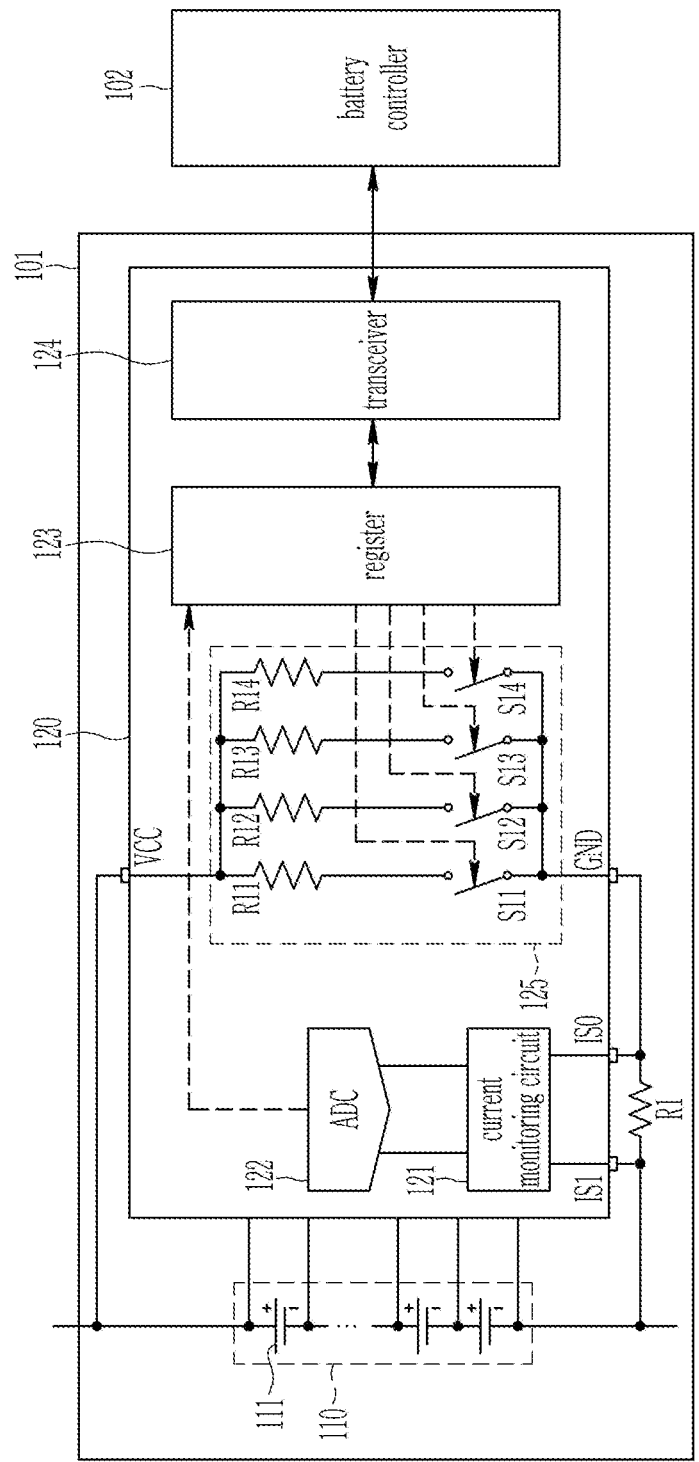
FIG. 2 schematically illustrates a battery module according to the first exemplary embodiment.
Figure 3:
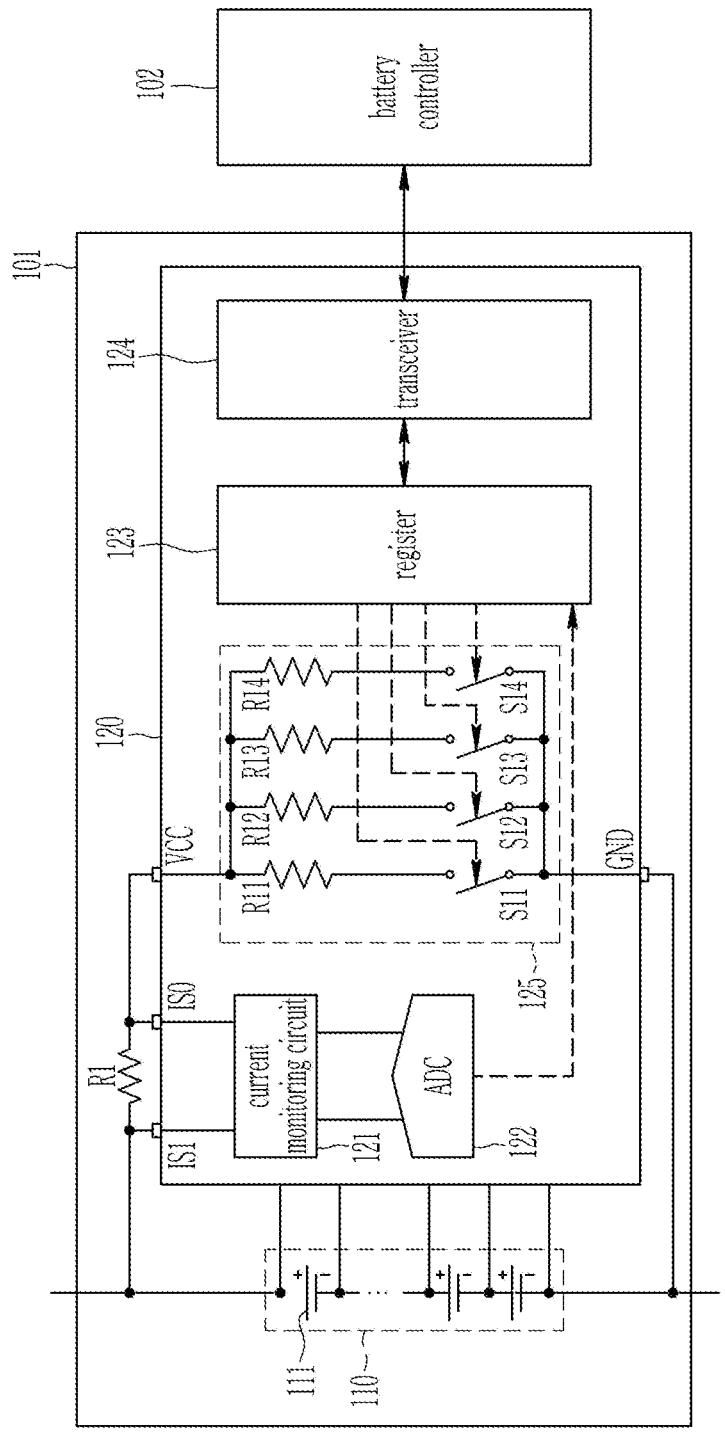
FIG. 3 schematically illustrates a battery module according to a second exemplary embodiment.
Figure 4:
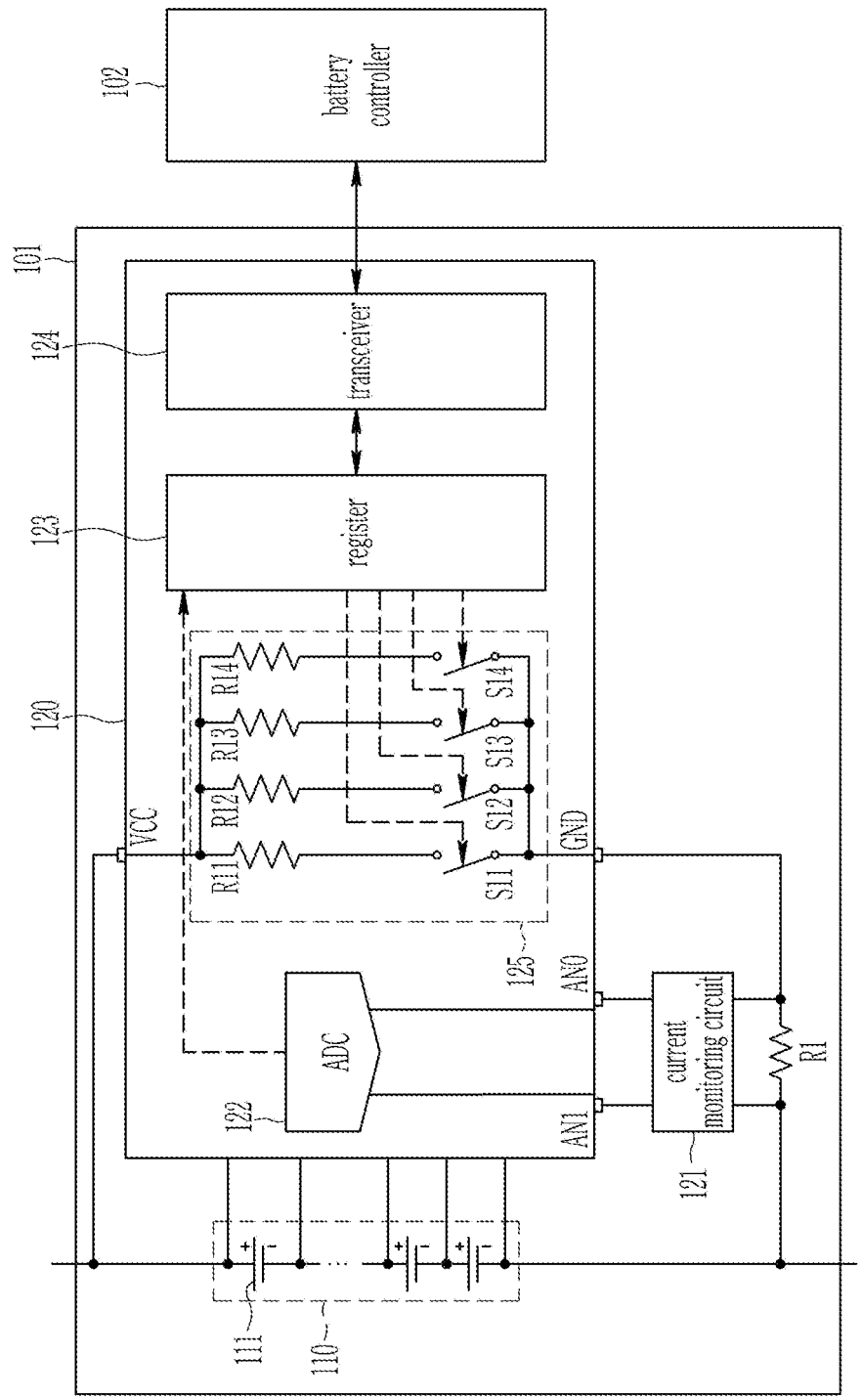
FIG. 4 schematically illustrates a battery module according to a third exemplary embodiment.
Figure 5:
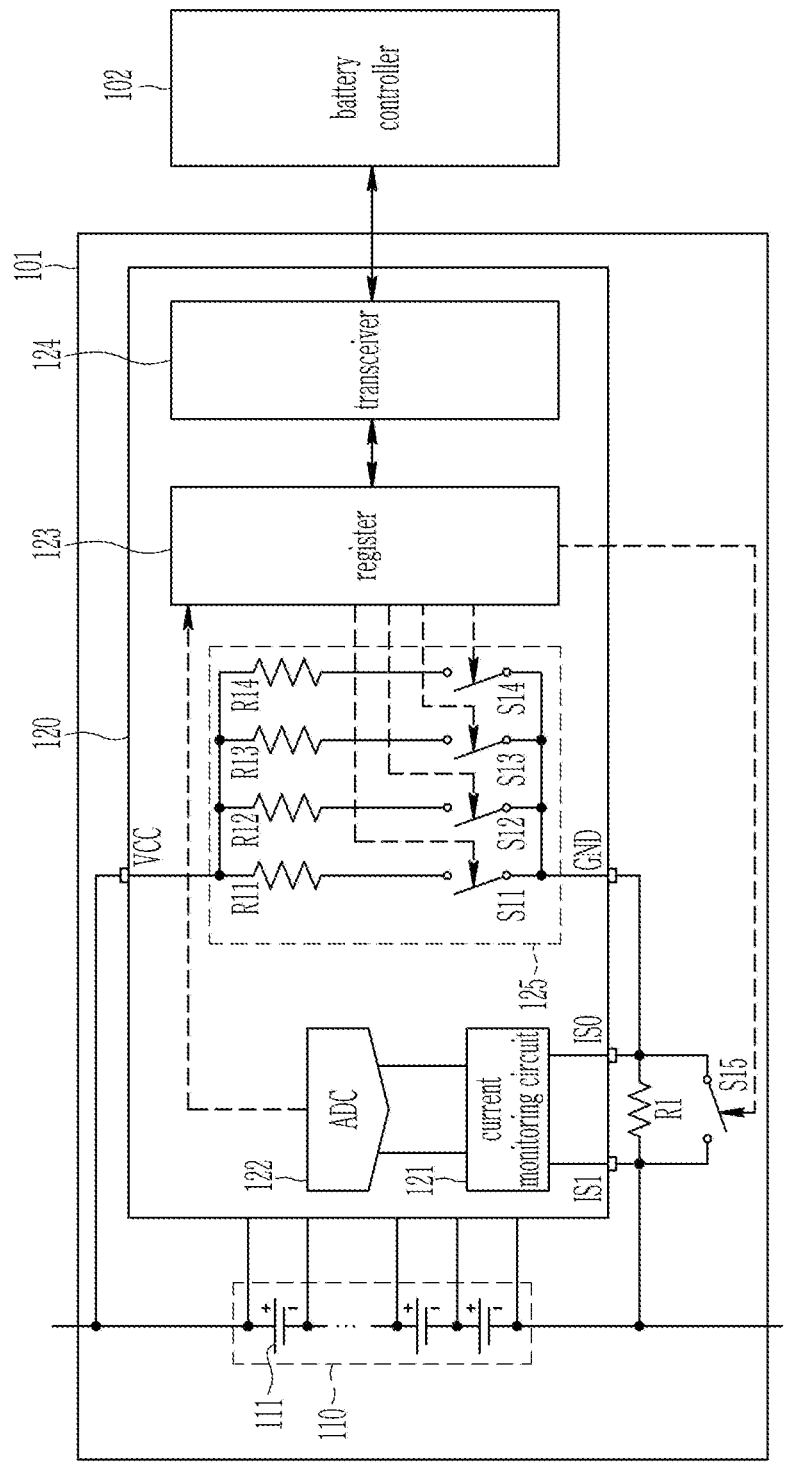
FIG. 5 schematically illustrates a battery module according to a fourth exemplary embodiment.

FIG. 1 schematically illustrates a battery pack according to a first exemplary embodiment. FIG. 2 schematically illustrates a battery module according to the first exemplary embodiment. FIG. 3, FIG. 4, and FIG. 5 schematically illustrate battery modules according to second, third, and fourth exemplary embodiments, respectively.

Referring to FIG. 1, a battery pack 100 according to the first embodiment may include a plurality of battery modules 101, a battery controller 102, and a battery cut-off circuit 103. Although a case where the battery pack 100 includes three battery modules 101 connected in series with each other is illustrated in FIG. 1 as an example, the present invention is not limited thereto, and a number of the battery modules 101 included in the battery pack 100 may be changed depending on an exemplary embodiment.

Each of the battery modules 101 includes a cell stack 110 and a voltage detection integrated circuit (IC) 120. Each of the battery modules 101 may further include a monitoring circuit 130 such as a temperature sensor in addition to the voltage detection IC 120.

Each cell stack 110 may include a plurality of cells 111 electrically connected to each other. Although a case where one cell stack includes a plurality of cells 111 connected in series with each other is illustrated in FIG. 1 as an example, the present invention is not limited thereto. According to another exemplary embodiment, a plurality of cells connected in parallel constitute a cell group, and a plurality of cell groups may be connected in series to constitute one cell stack.

The voltage detection IC 120 is a monitoring circuit for monitoring a voltage of the corresponding cell stack 110. The voltage detection IC 120 may perform a function of detecting a cell voltage of each of the cells 111 included in the corresponding cell stack 110. In addition, the voltage detection IC 120 may perform a function of detecting a total voltage of the corresponding cell stack 110. To this end, the voltage detection IC 120 may include a voltage detection circuit (not illustrated) for voltage detection. In this document, the voltage detection IC may include an analog front end (AFE) IC having a cell voltage detection function, a cell voltage monitoring (CVM) IC, and the like.

The voltage detection IC 120 may control cell balancing of the corresponding cell stack 110. The cell balancing is a function of equalizing the cell voltages between the cells 111 included in one cell stack 110. The battery module 101 includes balancing resistors (not illustrated) connected to each of the cells that constitute the cell stack 110 for cell balancing. The cell balancing of the battery module 101 may be controlled by conducting or blocking bypass currents of the respective balancing resistors by cell balancing switches (not illustrated) disposed inside the voltage detection IC 120.

The voltage detection IC 120 may be connected to a corresponding cell stack 110 through power terminals VCC and GND, to receive an operation power from the cell stack 110. The power terminals VCC and GND of the voltage detection IC 120 are electrically connected to corresponding terminals of opposite ends of the cell stack 110. For example, the power terminal VCC may be connected to a positive terminal of a highest potential cell among the cells included in the corresponding cell stack 110, and the ground power terminal GND may be connected to a negative terminal of a lowest potential cell among the cells included in the corresponding cell stack 110.

Each battery module 101 may include a current measurement resistor R1 for current measurement. The current measurement resistor R1 may be disposed on a path through which a current supplied from the cell stack 110 to the voltage detection IC 120 and the monitoring circuit 130 flows. For example, the current measurement resistor R1 may be disposed on a current path between the negative terminal of the lowest potential cell among the cells included in the corresponding cell stack 110 and ground terminals of the voltage detection IC 120 and the monitoring circuit 130. In this case, the current measurement resistor R1 may be electrically connected between a negative power terminal of the voltage detection IC 120, i.e., the ground terminal GND, and the negative terminal of the lowest potential cell among the plurality of cells included in the corresponding cell stack 110.

The voltage detection IC 120 may measure current consumption of the corresponding battery module 101, and may adjust the current consumption of the corresponding battery module 101 under the control of the battery controller 102.

Referring to FIG. 2, the voltage detection IC 120 may include a current measurement circuit.

The current measurement circuit may include a current monitoring circuit 121 and an analog-to-digital converter (ADC) 122.

The current monitoring circuit 121 is electrically connected to opposite ends of the current measurement resistor R1 through current measurement terminals IS0 and IS1 to measure a current flowing through the current measurement resistor R1.

A voltage between the opposite ends of the current measurement resistor R1 is proportional to the current flowing in the current measurement resistor R1. Therefore, the current monitoring circuit 121 may output a corresponding voltage value of the current flowing through the current measurement resistor R1 as a measured value. Since the current measurement resistor R1 is disposed on a path through which a current bypassing the monitoring circuit (the voltage detecting IC 120 and the monitoring circuit 130) flows, the measured value of the current monitoring circuit 121 may be a value corresponding to a current consumed in the detection IC 120 and the monitoring circuit 130.

The ADC 122 converts a measurement result of the current monitoring circuit 121 into a digital value and outputs it.

The voltage detection IC 120 may further include a current adjustment circuit 125.

The current regulating circuit 125 may adjust the current consumption of the voltage detection IC 120 by increasing or decreasing a current path between the power terminals VCC and GND of the voltage detection IC 120.

The current adjustment circuit 125 may include a plurality of current adjustment resistors R11, R12, R13, and R14 that are connected in parallel between the power terminals VCC and GND of the voltage detection IC 120. The current adjustment circuit 125 also includes a plurality of switches S11, S12, S13, and S14 connected between the current adjustment resistors R11, R12, R13, and R14 and a power terminal (e.g., a ground terminal GND). The switches S11, S12, S13, and S14 are used for conducting or blocking the connection between the corresponding resistors R11, R12, R13, and R14 and the power terminal (e.g., ground terminal GND). Each of the switches S11, S12, S13, and S14 is turned on/off by the control of the battery controller 102.

As a number of switches turned on in the switches S11, S12, S13, and S14 increases, a number of resistors connected in parallel between the power terminals VCC and GND of the voltage detection IC 120 increases. Therefore, the current path between the power terminals VCC and GND may be increased or decreased by the turn-on/turn-off control of the switches S11, S12, S13, and S14, thereby adjusting the current consumption in the voltage detection IC 120. As the current consumed by the voltage detection IC 120 is adjusted, a discharge current of the cell stack 110 may be correspondingly adjusted.

Although a case where four current adjustment resistors are connected in parallel between the power terminals VCC and GND of the voltage detection IC 120 is illustrated in FIG. 2 as an example, the present invention is not limited thereto, and a number of the current adjustment resistors connected in parallel between the power terminals VCC and GND of the voltage detection IC 120 may be changed.

The voltage detection IC 120 may include a register 123 and a transceiver 124 for communicating with the battery controller 102.

The register 123 may record an output value of the ADC 122 to transfer it to the battery controller 102 through the transceiver 124.

In addition, when control information of the switches S11, S12, S13, and S14 constituting the current adjustment circuit 125 is received from the battery controller 102 through the transceiver 124, the register 123 may control the turn-on/turn-off of the switches S11, S12, S13, and S14 based on the received control information.

Referring again to FIG. 1, the transceiver 124 of each voltage detecting IC 120 may communicate with another voltage detecting IC by a daisy chain method, and may communicate with the battery controller 102 through a daisy chain interface.

The battery controller 102 constitutes a battery management system (BMS) of the battery pack 100 together with the monitoring circuit (the voltage detection IC 120 and the monitoring circuit 130) of each battery module 101.

The battery controller 102 may receive a cell voltage detection result from each voltage detection IC 120 to control cell balancing of each battery module 101 based on the result. In addition, the battery controller 102 may receive a total voltage of the corresponding cell stack 110 from each voltage detection IC 120 to control balancing between the battery modules 101 based on the total voltage.

The battery controller 102 may control the battery cut-off circuit 103 for controlling charge/discharge of the battery pack 100 based on a cell voltage detection result of each voltage detection IC 120.

The battery controller receives a current consumption measurement result of the corresponding battery 101, i.e., a current consumption measurement result of the monitoring circuit including the voltage detection IC 120 from each voltage detection IC 120 to calculate a current consumption deviation between the battery modules 101 (a current consumption deviation between the monitoring circuits) based on the received result.

The battery controller 102 may control the current adjustment circuit 125 of each voltage detection IC 120 based on the current consumption deviation between the battery modules 101, so as to eliminate a current consumption imbalance between the battery modules 101. For example, the battery controller 102 may control the current adjustment circuit 125 in the corresponding voltage detection IC 120 to increase current consumption for the battery module 101 with relatively small current consumption.

Although a case where the current measurement resistor R1 is connected to the negative electrode of the lowest potential cell among the cells included in the corresponding cell stack 110 is illustrated in FIG. 1 and FIG. 2 as an example, the present invention is not limited thereto. For example, referring to FIG. 3, the current measurement resistor R1 may be connected to the positive electrode of the highest potential cell among the cells included in the corresponding cell stack 110. In this case, the current measurement resistor R1 may be electrically connected between the positive power terminal VCC of the voltage detection IC 120 and the positive terminal of the highest potential cell among the cells included in the corresponding cell stack 110, to be disposed on a path through which a current outputted from the cell stack 110 is supplied to the monitoring circuit (the voltage detection IC 120 and the monitoring circuit 130).

Although a case where the current measuring circuit is disposed inside each voltage detection IC is illustrated in FIG. 1 and FIG. 2, the present invention is not limited thereto. According to another exemplary embodiment, at least a portion of the current measurement circuit may be disposed outside the voltage detection IC 120. For example, referring to FIG. 4, the current monitoring circuit 121 of the current measurement circuit may be disposed outside the voltage detecting IC 120. In this case, the current monitoring circuit 121 may measure a voltage between opposite ends of the current measurement resistor R1 to correspond to the current flowing in the current measurement resistor R1 to transfer it to the ADC 122 in the voltage detection IC 120. In addition, for example, both the current monitoring circuit 121 and the ADC 122 may be disposed outside the voltage detection IC 120. In this case, the measurement result of the current measurement circuit may be directly transferred to the battery controller 102 without passing through the voltage detection IC 120.

In the meantime, when the current measurement resistor R1 is connected to the negative electrode of the lowest potential cell among the cells included in the corresponding cell stack 110, a reference potential of the voltage detection IC 120 may be varied, thereby affecting the voltage detection result of the voltage detection IC. Therefore, as illustrated in FIG. 5, the battery module 101 may further include a short-circuit switch S15 for controlling the connection between the current measurement resistor R1 and the cell stack 110. Referring to FIG. 5, the short-circuit switch S15 is connected in parallel with the current measurement resistor R1 between the power terminal GND of the voltage detection IC 120 and the cell stack 110. The short-circuit switch S15 is turned on or off depending on a control command of the battery controller 102 transferred through the voltage detecting IC 120. The battery controller 102 turns on the short-circuit switch S15 to short-circuit opposite ends of the current measurement resistor R1 so as to enable stable voltage detection during a period during which no current consumption is measured or a voltage detection period. When the current consumption needs to be measured, the battery controller 102 turns off the short-circuit switch S15 so that a consumption current flows through the current measurement resistor R1.

Although a case where a separate current adjustment circuit is provided inside the voltage detection IC 120 to adjust the current consumption of the battery module is illustrated in FIG. 1 to FIG. 5, the present invention is not limited thereto.

According to another exemplary embodiment, a battery balancing circuit of each battery module may be used to eliminate the current deviation between battery modules.

Figure 6:
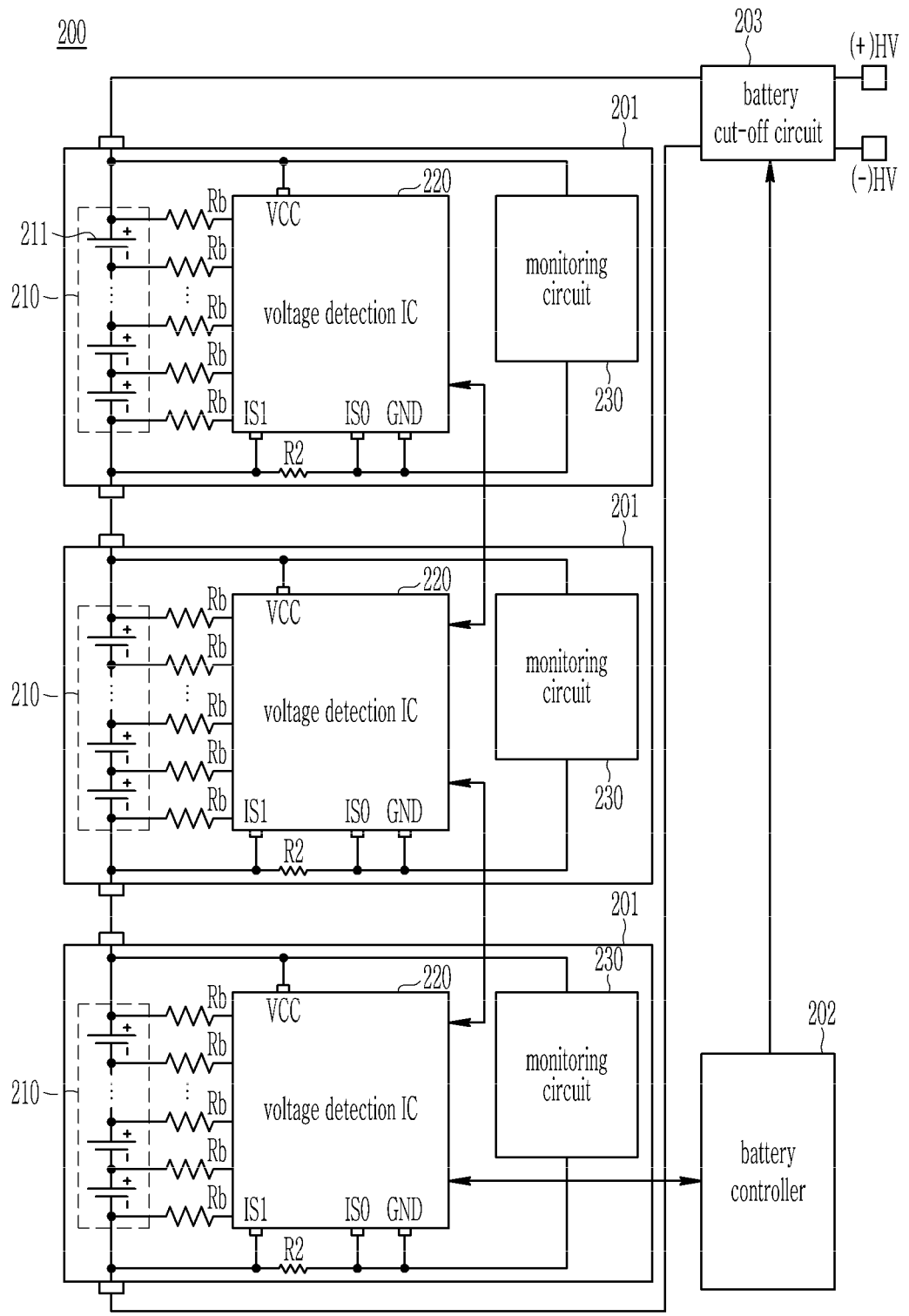
FIG. 6 schematically illustrates a battery pack according to a fifth exemplary embodiment.
Figure 7:
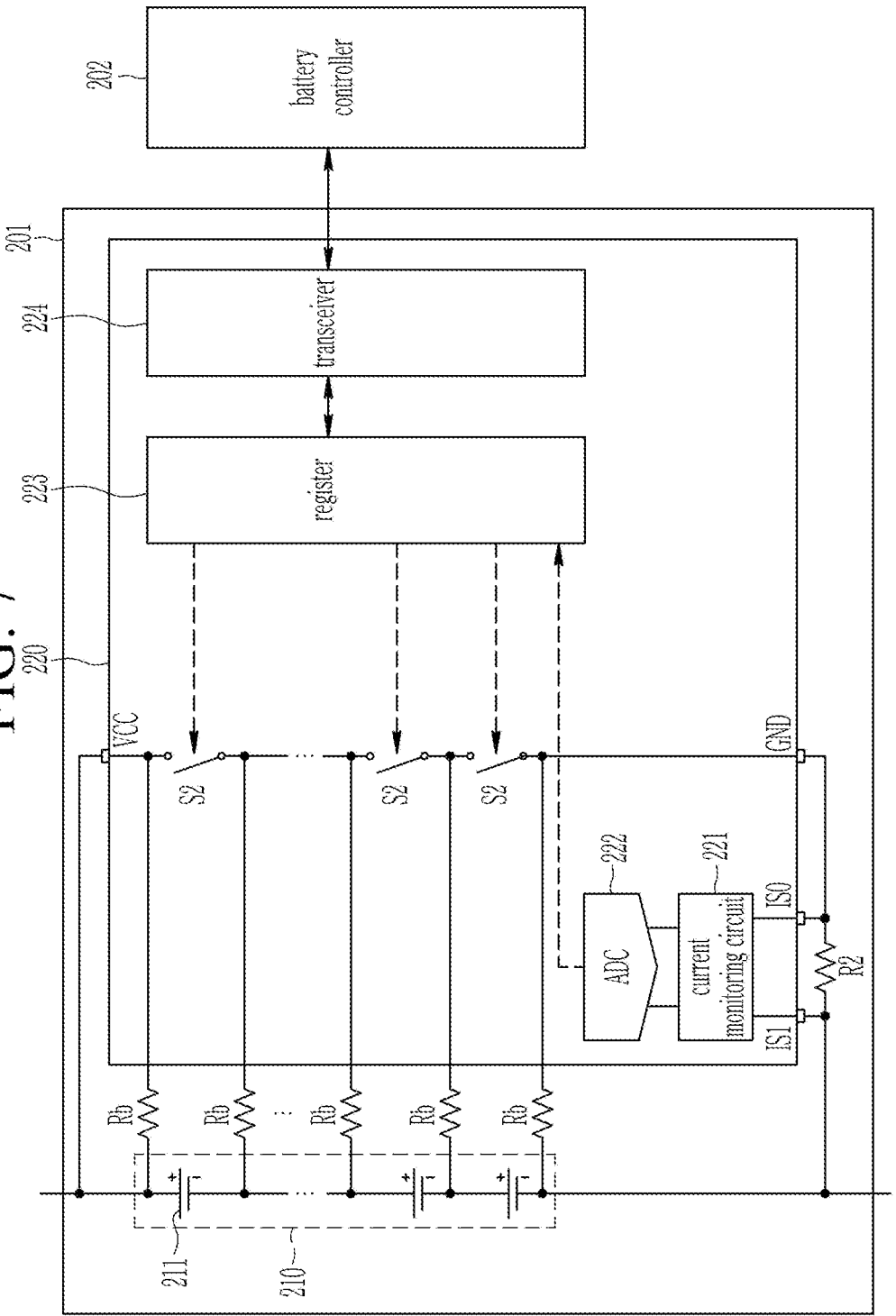
FIG. 7 schematically illustrates a battery module according to the fifth exemplary embodiment.

FIG. 6 illustrates a schematic view of a battery pack according to a fifth exemplary embodiment, showing a case where current consumption of the battery module is adjusted by using a cell balancing circuit. FIG. 7 schematically illustrates a battery module according to the fifth exemplary embodiment. Hereinafter, the same or similar constituent elements as those of the above-described battery pack 100 among constituent elements of the battery pack 200 will not be described in detail.

Referring to FIG. 6, a battery pack 200 according to the fifth embodiment may include a plurality of battery modules 201, a battery controller 202, and a battery cut-off circuit 203.

Each of the battery modules 201 includes a cell stack 210, a plurality of balancing resistors Rb, and a voltage detection IC 220. Each of the battery modules 201 may further include a monitoring circuit 230 such as a temperature sensor in addition to the voltage detection IC 220.

Each cell stack 210 may include a plurality of cells 211 electrically connected to each other.

The balancing resistors Rb may be connected between the corresponding cell and the voltage detection IC 220 to serve to discharge the corresponding cells.

The voltage detection IC 220 may serve to detect a cell voltage of each of the cells 211 included in the corresponding cell stack 210, and a total voltage of the corresponding cell stack 210 through a voltage detection circuit (not illustrated).

The voltage detection IC 220 may control cell balancing between the cells 211 included in the corresponding cell stack 210. The voltage detecting IC 220 may control the cell balancing of the corresponding cell stack 210 by conducting or blocking a current flowing through the corresponding balancing resistors Rb.

The voltage detection IC 220 is connected to the corresponding cell stack 210 through power terminals VCC and GND, to receive operation power from the cell stack 210. The power terminal VCC of the voltage detection IC 220 may be connected to a positive terminal of a highest potential cell among the cells included in the corresponding cell stack 210, and the power terminal GND may be connected to a negative terminal of a lowest potential cell among the cells included in the corresponding cell stack 210.

Each battery module 201 may include a current measurement resistor R2 for current measurement. The current measurement resistor R2 may be disposed on a path through which a current supplied from the cell stack 210 to the monitoring circuit (the voltage detection IC 220 and the monitoring circuit 230) flows. For example, the current measurement resistor R2 may be disposed on a current path that is connected between the negative terminal of the lowest potential cell among the cells included in the corresponding cell stack 210 and ground terminals of the monitoring circuit (the voltage detection IC 220 and the monitoring circuit 230). In this case, the current measurement resistor R2, as illustrated in FIG. 6, may be electrically between a negative power terminal of the voltage detection IC 220, i.e., the ground terminal GND, and the negative terminal of the lowest potential cell among the plurality of cells included in the corresponding cell stack 210. However, the present invention is not limited thereto, and the current measurement resistor R2 may be electrically connected between the positive power terminal VCC of the voltage detection IC 220 and the positive terminal of a highest potential cell among the cells included in the corresponding cell stack 210.

The voltage detection IC 220 may measure current consumption of the corresponding battery module 201, and may adjust the current consumption of the corresponding battery module 201 under the control of the battery controller 202.

Referring to FIG. 7, the voltage detection IC 220 may include a current measurement circuit. The current measurement circuit may include a current monitoring circuit 221 and an ADC 222.

The current monitoring circuit 221 is electrically connected to opposite ends of the current measurement resistor R2 through current measurement terminals IS0 and IS1 to measure a current flowing through the current measurement resistor R2. Since the current measurement resistor R2 is disposed on a path through which a current bypassing the monitoring circuit (the voltage detecting IC 220 and the monitoring circuit 230) flows, the measured value of the current monitoring circuit 221 may be a value corresponding to a current consumed in the detection IC 220 and the monitoring circuit 230.

The ADC 222 converts a measurement result of the current monitoring circuit 221 into a digital value and outputs it.

The voltage detection IC 220 may include a plurality of cell balancing switches S2. Each of cell balancing switches S2 may be connected between opposite ends of a corresponding cell to block or conduct a current path through the corresponding balancing resistor Rb under the control of the battery controller 202.

The battery balancing switches S2 and the balancing resistors Rb may also be used as a current control circuit for controlling the current consumption of the battery module 201 under the control of the battery controller 202. When the cell balancing switches S2 are turned on, the current path between the cell stack 210 and the voltage detection IC 220 increases, which increases the current consumption of the battery module 201, resulting in an increase in a discharge current of the cell stack 210. Therefore, unlike in the battery pack 100 of FIG. 1, the current consumption of the battery module 201 may be adjusted by using the cell balancing switches S2 and the balancing resistors Rb without providing a separate current adjustment circuit.

The voltage detection IC 220 may include a register 223 and a transceiver 224 for communicating with the battery controller 202.

The register 223 may record an output value of the ADC 222 to transfer it to the battery controller 202 through the transceiver 224.

In addition, when control information of the cell balancing switches S2 constituting a current adjustment circuit is received from the battery controller 202 through the transceiver 224, the register 223 may control the turn-on/turn-off of the cell balancing switches S2 based on the received control information.

Referring to FIG. 6 again, the battery controller 202 may receive a cell voltage detection result from each voltage detection IC 220 to control cell balancing of each battery module 201 by controlling the cell balancing switches S2 based on the result. In addition, the battery controller 202 may receive a total voltage of the corresponding cell stack 210 from the voltage detection IC 220 to control balancing between the battery modules 201 based on the total voltage.

The battery controller 202 may control the battery cut-off circuit 203 for controlling charge/discharge of the battery pack 200 based on a cell voltage detection result of each voltage detection IC 220.

The battery controller 202 may receive a current consumption measurement value of the corresponding battery module 201 from each voltage detection IC 220 to calculate a consumption current deviation between the battery modules 201 based on the measured consumption current values. The battery controller 202 may control the cell balancing switches S2 based on the current consumption deviation between the battery modules 201, so as to eliminate current consumption imbalance between the battery modules 201. For example, the battery controller 202 may conduct a current path of the corresponding balancing resistors Rb to increase current consumption for the battery module 201 with relatively small current consumption.

The battery controller 202 may adjust current consumption by simultaneously turning on all the corresponding cell balancing switches S2 for the battery module 201 requiring current consumption adjustment in order to minimize an influence of current consumption adjustment using the balancing resistors Rb on cell balancing. The battery controller 202 may adjust current consumption of each battery module 201 by calculating a discharge amount of each battery module 201 based on a current consumption deviation between the battery modules 201 and controlling turn-on duty of the cell balancing switches S2 included in each battery module 201 based on the calculated discharge amount.

The battery pack 200 having the above-described structure may prevent balance collapse between the battery modules 201 by measuring the current consumption of the battery modules 201 and controlling the current consumption between the battery modules 201 to be equalized based on the measured current consumption. In addition, the current consumption may be equalized without any additional cost since the current consumption between the battery modules 201 is equalized by using the balancing resistors Rb and the cell balancing switches S2 without a separate current adjustment circuit.

According to another exemplary embodiment, each battery module may include a separate current control circuit provided outside the voltage detection IC, thereby eliminating current consumption deviation between the battery modules.

Figure 8:
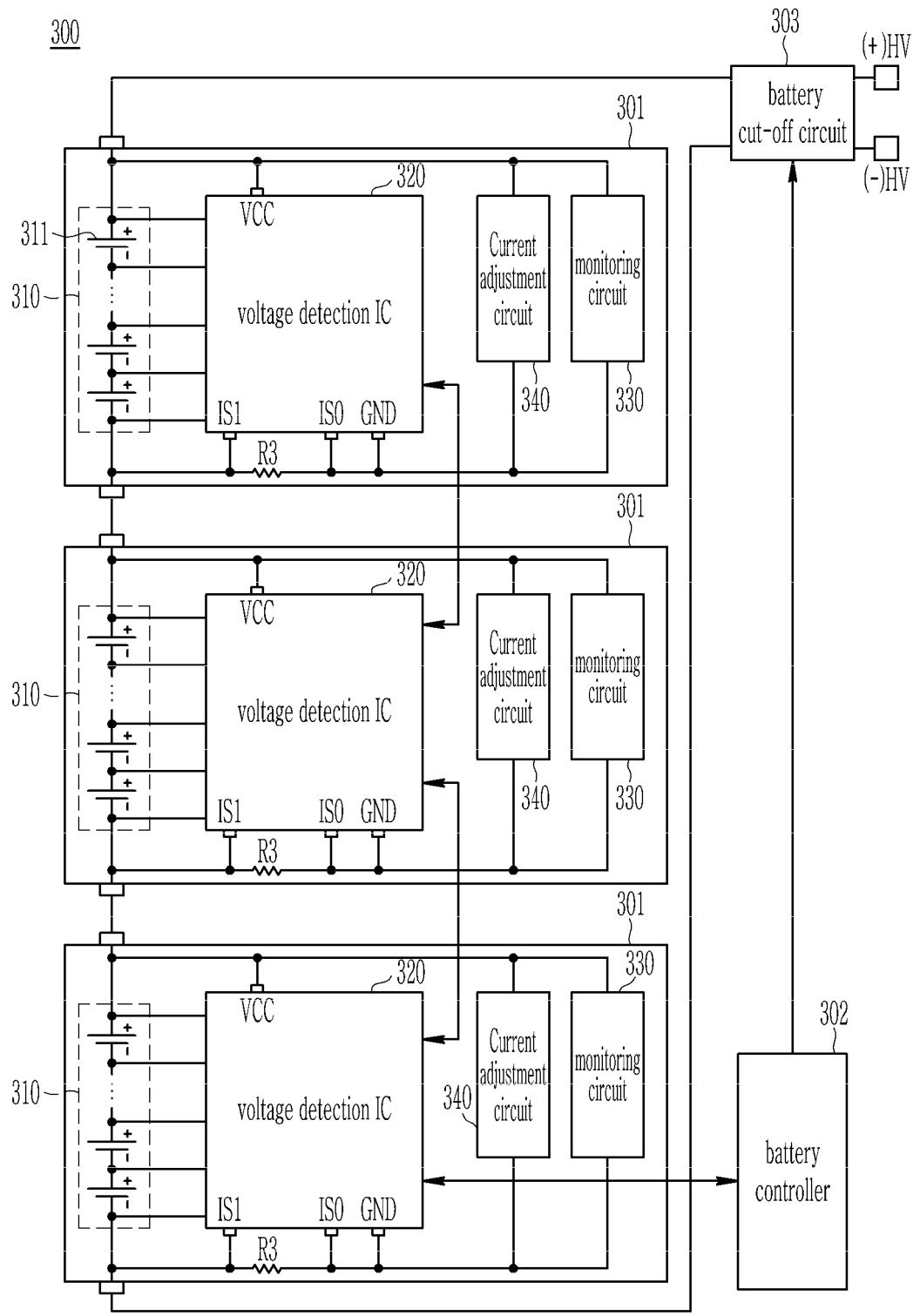
FIG. 8 schematically illustrates a battery pack according to a sixth exemplary embodiment.
Figure 9:
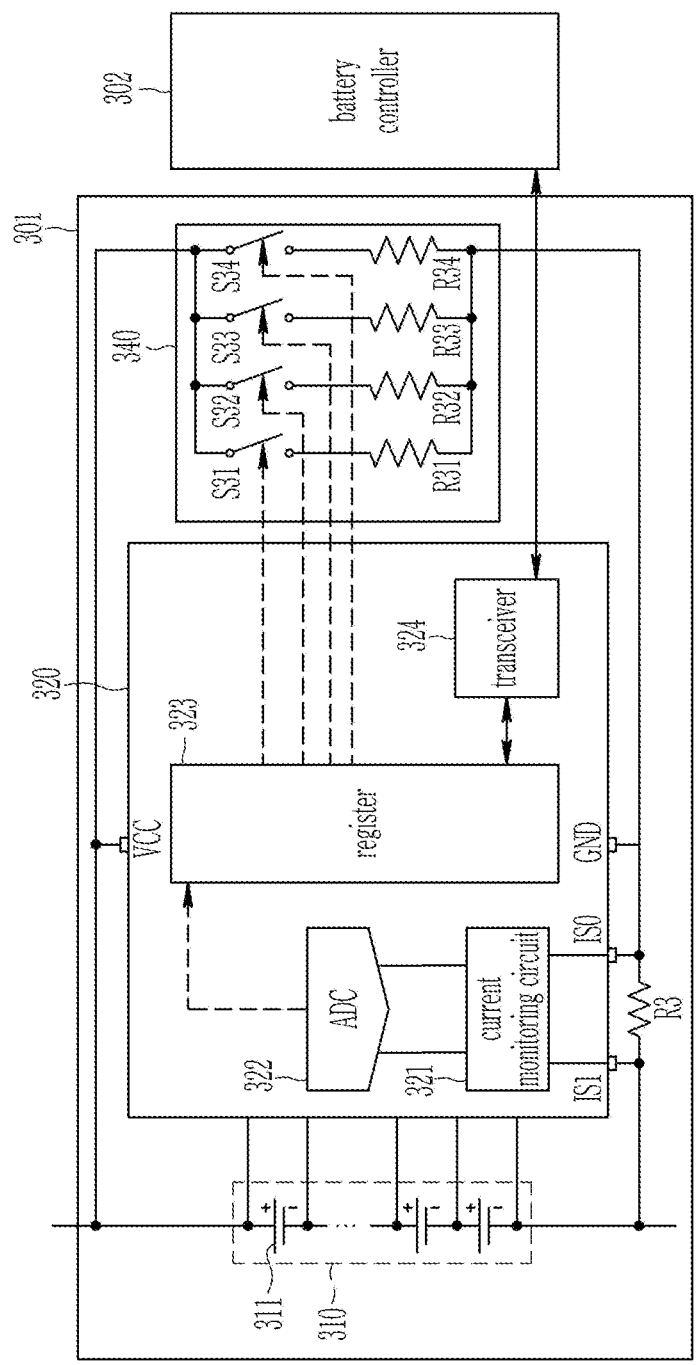
FIG. 9 schematically illustrates a battery module according to the sixth exemplary embodiment.

FIG. 8 illustrates a schematic view of a battery pack according to a sixth exemplary embodiment, showing a case where current consumption of the battery module is adjusted by using a separate current adjustment circuit provided outside a voltage detection IC. FIG. 9 schematically illustrates a battery module according to the sixth exemplary embodiment. Hereinafter, the same or similar constituent elements as those of the battery pack 100 according to the aforementioned first exemplary embodiment among constituent elements of a battery pack 300 according to the sixth exemplary embodiment will not be described in detail.

Referring to FIG. 8, the battery pack 300 according to the sixth embodiment may include a plurality of battery modules 301, a battery controller 302, and a battery cut-off circuit 303.

Each of the battery modules 301 includes a cell stack 310, a voltage detection IC 320, and a current adjustment circuit 340. Each of the battery modules 301 may further include a monitoring circuit 330 such as a temperature sensor in addition to the voltage detection IC 320.

Each cell stack 310 may include a plurality of cells 311 electrically connected to each other.

The voltage detection IC 320 may serve to detect a cell voltage of each of the cells 311 included in the corresponding cell stack 310 and a total voltage of the corresponding cell stack 310 through a voltage detection circuit (not illustrated).

The voltage detection IC 320 may control cell balancing between the cells 311 included in the corresponding cell stack 310. The voltage detection IC 320 may control cell balancing by conducting or blocking a bypass current of the balancing resistor (not illustrated) connected to each of the cells 311.

The voltage detection IC 320 is connected to the cell stack 310 through power terminals VCC and GND, to receive operation power from the cell stack 310.

Each battery module 301 may include a current measurement resistor R2 for current measurement. The current measurement resistor R3 may be disposed on a path through which a current supplied from the cell stack 310 to the voltage detection IC 320 and the monitoring circuit 330 flows. For example, the current measurement resistor R3 may be disposed on a current path that is connected between the negative terminal of the lowest potential cell among the cells included in the corresponding cell stack 310 and ground terminals of the voltage detection IC 320 and the monitoring circuit 330. In this case, the current measurement resistor R3, as illustrated in FIG. 8, may be electrically connected between a negative power terminal of the voltage detection IC 320, i.e., the ground terminal GND, and the negative terminal of the lowest potential cell among the plurality of cells included in the corresponding cell stack 310. However, the present invention is not limited thereto, and the current measurement resistor R3 may be electrically connected between the positive power terminal VCC of the voltage detection IC 320 and the positive terminal of a highest potential cell among the cells included in the corresponding cell stack 310.

The voltage detection IC 320 may measure current consumption of the corresponding battery module 301.

Referring to FIG. 9, the voltage detection IC 320 may include a current measurement circuit. The current measurement circuit may include a current monitoring circuit 321 and an ADC 322.

The current monitoring circuit 321 is electrically connected to opposite ends of the current measurement resistor R3 through current measurement terminals IS0 and IS1 to measure a current flowing through the current measurement resistor R3. Since the current measurement resistor R3 is disposed on a path through which a current bypassing the monitoring circuit (the voltage detecting IC 320 and the monitoring circuit 330) flows, the measured value of the current monitoring circuit 321 may be a value corresponding to a current consumed in the detection IC 320 and the monitoring circuit 330.

The ADC 322 converts a measurement result of the current monitoring circuit 321 into a digital value and outputs it.

The voltage detection IC 320 may include a register 323 and a transceiver 324 for communicating with the battery controller 302.

The register 323 may record an output value of the ADC 322 to transfer it to the battery controller 302 through the transceiver 324.

In addition, when control information of the switches S31, S32, S33, and S34 constituting the current adjustment circuit 340 is received from the battery controller 302 through the transceiver 324, the register 323 may control the turn-on/turn-off of the switches S31, S32, S33, and S34 based on the received control information.

The current adjustment circuit 340 may serve to adjust the current consumption of the corresponding battery module 301 under the control of the battery controller 302.

The current adjustment circuit 340 may include a plurality of current adjustment resistors R31, R32, R33, and R34 connected in parallel between the power terminals VCC and GND of the corresponding cell stack 310. The current adjustment circuit 340 may further include a plurality of switches S31, S32, S33, and S34 connected between the respective current adjustment resistors R31, R32, R33, and R34 and the corresponding cell stack 310. The switches S31, S32, S33, and S34 are used for conducting or blocking a current path of the corresponding resistors R31, R32, R33, and R34. Each of the switches S31, S32, S33, and S34 is controlled to be turned on/off by a control command of the battery controller 302 transferred through the voltage detection IC 320.

As the plurality of switches S31, S32, S33, and S34 are turned on or off, a current discharged by the current adjustment circuit 340 may be reduced, and thus a current consumed by the current adjustment circuit 340 may be adjusted.

Referring to FIG. 8 again, the battery controller 302 may receive a cell voltage detection result from each voltage detection IC 320 to control cell balancing of the corresponding cell stack 310 based on the result 310. In addition, the battery controller 302 may receive a total voltage of the corresponding cell stack 310 from the voltage detection IC 320 to control balancing between the cell stacks 310 based on the total voltage.

The battery controller 302 may control the battery cut-off circuit 303 for controlling charge/discharge of the battery pack 300 based on a cell voltage detection result of each voltage detection IC 320.

The battery controller 302 may receive a current consumption measurement value of the corresponding battery module 301 from each voltage detection IC 320 to control the current adjustment circuit 340 based on the measured consumption current values such that current a consumption imbalance between the battery modules 301 is eliminated.

For example, the battery controller 302 may increase or decrease a current path inside the corresponding current adjustment circuit 340 to adjust the current consumption for the battery module 301 requiring adjustment of the current consumption. As a number of switches that are turned on among the switches S31, S32, S33, and S34 of the current adjusting circuit 340 increases, a number of resistors connected to the corresponding cell stack 310 increases. As a result, a current path of the current adjusting circuit 340 through which a current discharged from the cell stack 310 flows increases, and thus the current consumption of the battery module 301 also increases.

In addition, for example, the battery controller 302 may adjust a discharge time of the corresponding current adjustment circuit 340 to adjust the current consumption for the battery module 301 requiring adjustment of the current consumption. In this case, the battery controller 302 calculates the discharge amount of each battery module 301 on the basis of the current consumption deviation between the battery modules 301. Turn-on times of the switches S31, S32, S33, and S34 constituting the current adjustment circuit 340 may be adjusted based on the calculated discharge amount to eliminate the current consumption imbalance between the battery modules 301.

Although a case where the current measurement resistors are used for measuring the current consumption of the battery modules is illustrated as an example in the aforementioned exemplary embodiments, the present invention is not limited thereto, and the current measurement circuit used to measure the current consumption of the battery modules may be replaced by another circuit capable of current detection.

According to the aforementioned exemplary embodiments, the battery management system may prevent balance collapse between the battery modules by measuring the current consumption of the battery modules and controlling the current consumption between the battery modules to be equalized based on the measured current consumption.

While exemplary embodiments of the present invention have been particularly shown and described with reference to the accompanying drawings, the specific terms used herein are only for the purpose of describing the invention and are not intended to define the meanings thereof or be limiting of the scope of the invention set forth in the claims. Therefore, those skilled in the art will understand that various modifications and other equivalent embodiments of the present invention are possible. Consequently, the true technical protective scope of the present invention must be determined based on the technical spirit of the appended claims.

DESCRIPTION OF SYMBOLS 100, 200, 300: battery pack
101, 201, 301: battery module
102, 202, 302: battery controller
103, 203, 303: battery cut-off circuit
110, 210, 310: cell stack
111, 211, 311: cell
120, 220, 320: voltage detection IC
121, 221, 321: current monitoring circuit
122, 222, 322: ADC
123, 223, 323: register
124, 224, 324: transceiver
125, 340: current adjustment circuit
130, 230, 330: monitoring circuit
R1, R2, R3: current measurement resistor

The invention claimed is:
1. A battery pack comprising:
a plurality of cell stacks;
a plurality of monitoring circuits configured to detect voltages of a plurality of cells included in a corresponding cell stack among the plurality of cell stacks;
a plurality of current measurement circuits configured to measure current consumption of a corresponding monitoring circuit among the plurality of monitoring circuits;
a plurality of current adjustment circuits configured to adjust a discharge current of a corresponding cell stack among the plurality of cell stacks; and
a battery controller configured to receive a current consumption measurement result of the plurality of monitoring circuits from the plurality of current measurement circuits, to calculate current consumption deviation between the plurality of monitoring circuits based on the current consumption measurement result of the plurality of monitoring circuits, and to control the plurality of current adjustment circuits based on the current consumption deviation.

2. The battery pack of claim 1, further comprising
a plurality of current detection resistors respectively connected between the plurality of cell stacks and the plurality of monitoring circuits,
wherein each of the plurality of current measurement circuits measures a current flowing through a corresponding current detection resistor among the plurality of current detection resistors and outputs the measured current as a measured value of the current consumption.

3. The battery pack of claim 2, wherein
each of the plurality of monitoring circuits includes a voltage detection integrated circuit, and
each of the plurality of current detection resistors is connected between a corresponding one of the plurality of cell stacks and a power terminal of the voltage detection integrated circuit.

4. The battery pack of claim 3, wherein
the plurality of current measurement circuits are disposed within the voltage detection integrated circuit of a corresponding monitoring circuit among the plurality of monitoring circuits.

5. The battery pack of claim 3, wherein
the plurality of current adjustment circuits are disposed within the voltage detection integrated circuit of a corresponding monitoring circuit among the plurality of monitoring circuits.

6. The battery pack of claim 2, further comprising
a plurality of short-circuit switches respectively connected between the plurality of cell stacks and the plurality of monitoring circuits,
wherein each of the short-circuit switches is connected in parallel with a corresponding one of the plurality of current detection resistors.

7. The battery pack of claim 6, wherein
the battery controller controls the plurality of short-circuit switches to be turned off during a period for measuring current consumption by using the plurality of current measurement circuits.

8. The battery pack of claim 7, wherein
the battery controller controls the plurality of short-circuit switches to be turned on during a period for detecting cell voltages by using the plurality of monitoring circuits.

9. The battery pack of claim 2, wherein
each of the plurality of current detection resistors is connected between a negative terminal of a lowest potential cell among a plurality of cells included in a corresponding cell stack of the plurality of cell stacks and a ground terminal of a corresponding monitoring circuit of the plurality of monitoring circuits.

10. The battery pack of claim 1, wherein
each of the plurality of current adjustment circuits includes:
a plurality of resistors connected between opposite ends of a corresponding cell stack of the plurality of cell stacks; and
a plurality of switches connected to corresponding resistors of the plurality of resistors to block or conduct current flows of the corresponding resistors.

11. The battery pack of claim 10, wherein
the battery controller adjusts a discharge current of a corresponding cell stack of the plurality of cell stacks by adjusting a number of switches that are turned on among the plurality of switches.

12. The battery pack of claim 1, wherein
each of the plurality of current adjustment circuits includes:
a plurality of balancing resistors connected between a corresponding cell stack of the plurality of cell stacks and a corresponding monitoring circuit of the plurality of monitoring circuits; and
a plurality of switches connected to corresponding balancing resistors of the plurality of balancing resistors to block or conduct current flows of the corresponding balancing resistors.

13. The battery pack of claim 12, wherein
the battery controller receives a cell voltage detection result for each of the plurality of cell stacks through the plurality of monitoring circuits, and controls cell balancing of each of the plurality of cell stacks by controlling the plurality of switches based on the cell voltage detection results.

14. The battery pack of claim 12, wherein
the battery controller turns on the plurality of switches included in a corresponding current adjustment circuit among the plurality of current adjustment circuits for a monitoring circuit having relatively small current consumption among the plurality of monitoring circuits.

15. The battery pack of claim 14, wherein
the battery controller controls a turn-on duty of the plurality of switches included in each of the plurality of current adjustment circuits to adjust a current consumption amount of the plurality of current adjustment circuits.

16. A battery pack comprising:
a cell stack configured to include a plurality of cells;
a voltage detection integrated circuit electrically connected to the cells to detect cell voltages of the cells;
a current measurement resistor connected between one of opposite ends of the cell stack and a power terminal of the voltage detection integrated circuit;
a short-circuit switch connected in parallel with the current measuring resistor;
a current measurement circuit configured to measure a current flowing in the current measurement resistor;
a current adjustment circuit connected between opposite ends of the cell stack to adjust a discharge current of the cell stack; and
a battery controller configured to control turn-on of the short-circuit switch, to receive a current measurement result from the current measurement circuit in a state where the short-circuit switch is turned off, and to control the current adjustment circuit based on the current measurement result.

\* \* \* \* \*